United States Patent
Simhadri et al.

(10) Patent No.: US 10,191,943 B2
(45) Date of Patent: Jan. 29, 2019

(54) DECORRELATION OF USER-DEFINED FUNCTION INVOCATIONS IN QUERIES

(71) Applicants: Indian Institute of Technology Bombay, Mumbai (IN); Indian Institute of Technology Hyderabad, Yeddumailaram (IN)

(72) Inventors: Varun Simhadri, Maharashtra (IN); Karthik Ramachandra, Maharashtra (IN); Arun Chaitanya Miriappalli, Maharashtra (IN); Ravindra Guravannavar, Maharashtra (IN); Sundararajarao Sudarshan, Maharashtra (IN)

(73) Assignees: Indian Institute of Technology Bombay, Mumbai (IN); Indian Institute of Technology Hyderabad, Yeddumailaram (IN)

( * ) Notice: Subject to any disclaimer, the term of this patent is extended or adjusted under 35 U.S.C. 154(b) by 754 days.

(21) Appl. No.: 14/170,386

(22) Filed: Jan. 31, 2014

(65) Prior Publication Data
US 2015/0220597 A1    Aug. 6, 2015

(51) Int. Cl.
G06F 17/30    (2006.01)

(52) U.S. Cl.
CPC .. G06F 17/30448 (2013.01); G06F 17/30327 (2013.01); G06F 17/30961 (2013.01)

(58) Field of Classification Search
CPC ......... G06F 17/30327; G06F 17/30442; G06F 17/30961

USPC ......................................................... 707/797
See application file for complete search history.

(56) References Cited

U.S. PATENT DOCUMENTS

| | | | |
|---|---|---|---|
| 6,411,951 B1 * | 6/2002 | Galindo-Legaria | G06F 17/30436 |
| 7,447,680 B2 | 11/2008 | Day et al. | |
| 8,332,373 B1 * | 12/2012 | Milby | G06F 17/30292 707/702 |
| 8,554,760 B2 * | 10/2013 | Subbiah | G06F 17/30463 707/713 |
| 8,661,023 B1 * | 2/2014 | Chun | G06F 17/30961 707/718 |
| 2003/0037048 A1 | 2/2003 | Kabra et al. | |

(Continued)

OTHER PUBLICATIONS

A. Cheung, S. Madden, O. Arden, and A. C. Myers. Automatic Partitioning of Database Applications. In Intl. Conf. on Very Large Databases, 2012.

(Continued)

*Primary Examiner* — Mark E Hershley
(74) *Attorney, Agent, or Firm* — McCarter & English, LLP; David R. Burns

(57) ABSTRACT

Systems, methods, and computer-readable medium, are disclosed for transforming user-defined-function invocations in a query-based environment. A user-defined-function (UDF) and a query invoking the UDF are received. The UDF is parsed into a plurality of statements. A first expression tree corresponding to the UDF and a second expression tree corresponding the query are constructed, and merged using an operator to generate a transformed expression. The transformed expression is simplified, using transformation rules, if it is determined that is can be simplified.

11 Claims, 15 Drawing Sheets

(56) References Cited

U.S. PATENT DOCUMENTS

| | | | | |
|---|---|---|---|---|
| 2003/0176931 | A1* | 9/2003 | Pednault | G06F 17/30539 700/31 |
| 2005/0160100 | A1 | 7/2005 | Eikenhorst et al. | |
| 2007/0239656 | A1 | 10/2007 | Santosuosso | |
| 2008/0065674 | A1* | 3/2008 | Liu | G06F 17/30454 |
| 2008/0071785 | A1* | 3/2008 | Kabra | G06F 17/30306 |
| 2009/0150367 | A1* | 6/2009 | Melnik | G06F 17/30917 |
| 2011/0055197 | A1* | 3/2011 | Chavan | G06F 17/3046 707/713 |
| 2012/0078939 | A1* | 3/2012 | Chen | G06F 17/30516 707/769 |
| 2013/0024848 | A1* | 1/2013 | Bhaskaracharya | G06F 8/443 717/147 |
| 2014/0195512 | A1* | 7/2014 | Ramachandra | G06F 17/30457 707/713 |

OTHER PUBLICATIONS

A. Poulovassilis and C. Small. Algebraic Query Optimisation for Database Programming Languages. VLDB Journal, 1996.

C.A. Galindo-Legaria and M.M. Joshi, Orthogonal Optimization of Subqueries and Aggregation, in ACM SIGMOD 2001.

R. H. Katz and E. Wong. Decompiling CODASYL DML into Retional Queries. ACM Trans. on Database Systems, 7(1):1-23, 1982.

S. Chaudhuri and K. Shim. Optimization of Queries with User-defined Predicates. In Intl. Conf. on Very Large Databases, 1996.

V. Simhadri, K. Ramachandra, et al., Decorrelation of User Defined Function Invocations in Queries, 2014.

Olston et al., Pig Latin: A Not-So-Foreign Language for Data Processing. ACM SIGMOD, 12 pages, 2008.

Lieuwen et al., A Transformation Based Approach to Optimizing Loops in Database Programming Languages. ACM SIGMOD, pp. 91-100, 1992.

Demo et al., Analysis of the Context Dependency of CODASYL FIND—Statements with Application to a Database Program Conversion. ACM SIGMOD, pp. 354-361, 1985.

Rauchwerger et al., Parallelizing While Loops for Multiprocessor Systems. Proc. of the 9th International Parallel Processing Symposium, 10 pages, 1995.

Elhemaliet et al., Execution Strategies for SQL Subqueries. ACM SIGMOD, pp. 993-1004, 2007.

Seshadret et al., Complex Query Decorrelation. Intl. Conf. on Data Engineering, pp. 450-457, 1996.

Guravannavar et al., Rewriting Procedures for Batched Bindings. Intl. Conf. on Very Large Databases, pp. 1107-1123, 2008.

Guravannavar, Optimizing Nested Queries and Procedures. PhD thesis, Indian Institute of Technology—Bombay, Department of Computer Science & Engineering, 170 pages, 2009.

Dayal, Of Nests and Trees: A Unified approach to Processing Queries That Contain Nested Subqueries, Aggregates, and Quantifiers. Intl. Conf. on Very Large Databases, pp. 197-208, 1987.

Kim, On Optimizing an SQL-like Nested Query. ACM Transactions on Database Systems. Sep. 1982;7(3):443-469.

* cited by examiner

DECORRELATION OF USER-DEFINED FUNCTION INVOCATIONS IN QUERIES

TECHNICAL FIELD

The present disclosure relates generally to Structured Query Language (SQL) queries and more particularly to automatically unnesting/decorrelating SQL queries containing User defined Functions (UDF).

BACKGROUND

SQL is the most commonly used language for querying relational databases. Queries written in SQL can make use of User-Defined Functions. User-defined functions are often written using a mix of imperative programming language constructs and SQL. The performance of a query containing a user-defined functions can be greatly improved by transforming the query into another equivalent query in which the computation done by imperative statements inside the user-defined function is expressed as set-oriented SQL operations, and the per-row execution of queries inside the function body are transformed into set-oriented execution. The process of transforming a query in this way is termed "query unnesting" or "query decorrelation."

Methods for query unnesting have been developed for nested SQL queries. Nested SQL queries are queries that contain a sub-query. However, these conventional unnesting techniques developed for nested SQL queries cannot be applied for queries containing user-defined functions, which may contain application logic expressed using imperative language constructs along with multiple parameterized queries.

Queries containing user-defined functions can be manually unnested or decorrelated. But, such manual unnesting is time consuming and error prone.

Queries containing user-defined functions may be nested queries with complex inner (sub-query) blocks. In the case of nested queries, the inner block is simply another SQL query with correlation variables used as its parameters. However, UDFs often use a mix of imperative language constructs and SQL, and queries inside UDFs are embedded inside procedural code. There has been a lot of work on efficient evaluation of nested queries by unnesting or decorrelating nested queries. However, these conventional query unnesting techniques cannot be used to unnest queries having UDFs, except for very simple ones (with no imperative constructs).

DETAILED DESCRIPTION OF EXEMPLARY EMBODIMENTS

Figure 1:
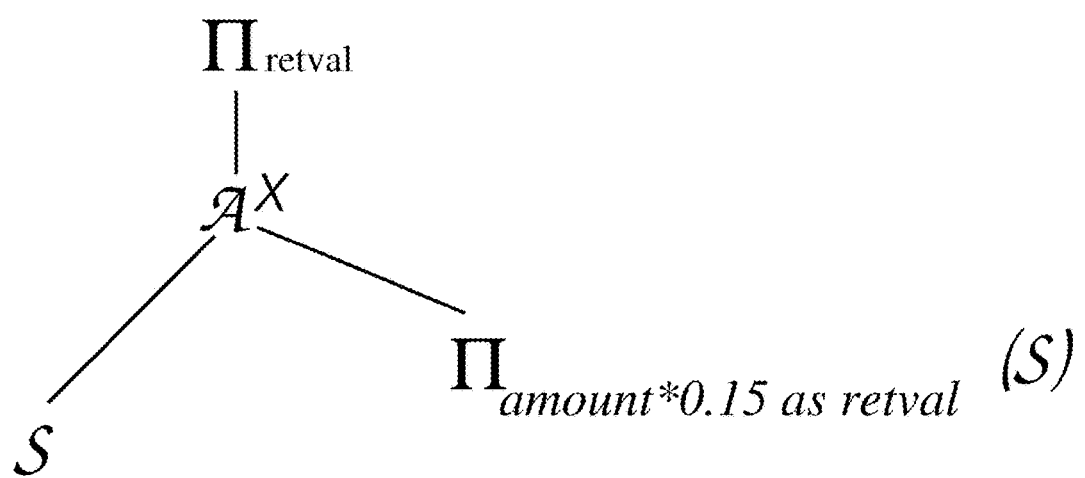
FIG. 1 shows an example expression tree for a user-defined function (UDF) in accordance with an aspect of the present disclosure.

The present disclosure relates to methods, systems and computer-readable medium for automatically decorrelating user-defined functions (UDFs) Invocations in SQL queries and is explained below with reference to the accompanying drawings and examples in accordance with an embodiment of the present disclosure.

Most database systems, both commercial and open-source, provide support for invoking user-defined functions (UDFs) from SQL queries. Calls to UDFs can appear in the SELECT, FROM, WHERE and the HAVING clause. These functions may be written using a rich set of imperative language constructs such as assignment, conditional control transfer and looping. Functions can also execute SQL queries in turn. They can return a scalar value or a set of tuples. UDFs encourage modularity and programmers prefer imperative constructs for many tasks. UDFs also make it possible for expressing computation, which is hard or impossible to write in standard SQL.

Database queries written in SQL may contain calls to user-defined functions. User-defined functions called from an SQL query contain other SQL queries along with application logic expressed using imperative language constructs Imperative language constructs include variable declaration statements, assignment statements, conditional control transfer statements such as if-then-else/CASE statements and looping statements. The conventional systems for evaluating an SQL query 'Q' containing a user defined function 'F' involves the following steps:

1. For each record produced by the FROM of the query 'Q', the values of the function parameters are assigned;
2. The function 'F' is executed, which involves the execution of any queries inside the function; and
3. The return value of the function 'F' is then used to complete the evaluation of the query 'Q.'

The above method results in repeated execution of the function 'F' and of the queries inside 'F.' Function 'F' (and hence any query inside it) is executed for every record produced by the 'FROM' clause of the query 'Q.' Such a method of executing queries containing user-defined functions has at least two drawbacks. Queries inside the UDF are executed many times during a single execution of the query containing the UDF, which leads to poor performance, and control switches frequently between the SQL execution engine and the execution engine for the imperative language statements, which also leads to poor performance.

The methods and systems described herein enables unnesting of queries that use UDFs as nested blocks, and overcome the drawbacks of conventional methods.

The present disclosure uses the following terminology and notation.

The Single relation (S): This is a relation with a single empty tuple and no attributes. It is used to return scalar constants or computed values as relations.

$\perp$: Value of an uninitialized variable. It can be either null or a language specific default value for the data type.

$\Pi^d$: Projection without duplicate removal.

Conditional Expressions: Conditional expressions are denoted using the following notation: $(p_1?e_1:p_2?e_2: \ldots :e_n)$.

An expression of this form evaluates to $e_1$ if predicate $p_1$ evaluates to true, to $e_2$ if $p_2$ evaluates to true and so on. If none of the predicates $p_1, \ldots, p_{n-1}$ evaluates to true, the expression evaluates to $e_n$. The SQL case statement is analogous to a conditional expression, and is a convenient way to compute an expression in a predicated manner.

Generalized projection: Projection (both with and without duplicate removal) can involve expressions. The result of an expression e can be assigned a new name n, using the syntax e as n. Note that the expression can invoke a UDF and can also be a conditional expression.

Rename operator: $\rho_{r(\alpha_1, \ldots, \alpha_n)}$ (e) returns the result of relational algebra expression e under the name r with attributes renamed as $\alpha_1, \ldots, \alpha_n$. When only attribute renaming is needed we use $\rho_{\_(\alpha_1, \ldots, \alpha_n)}$ (e). Individual attribute scan also be renamed using the as keyword in projections.

Group-by operator: $_{\alpha_1, \ldots, \alpha_n}G_{f_1(), \ldots, f_m()}$ (e) is used to denote a group-by expression, where $\alpha_1, \ldots, \alpha_n$ are the grouping columns, and $f_1, \ldots, f_m$ are the aggregate functions. The grouping columns are optional.

The Apply operator is extended to model imperative constructs in the UDF. In order to achieve this, three extensions of the standard Apply operator have been defined.

Apply-Bind extension: UDF invocations implicitly perform a mapping of formal to actual parameters. In order to represent UDF invocations algebraically, the present disclosure defines a bind extension to the Apply operator. This extension allows the Apply operator to optionally accept a list of parameter mappings of the form $p_1=\alpha_1, \ldots, p_n=\alpha_n$, where $\alpha_1, \ldots, \alpha_n$ are the attributes of the left child of the Apply, and the right child is parameterized by $p_1, \ldots, p_n$. Such a mapping, if provided, is performed by the operator before evaluating its right child. We denote this as follows:

$$E_1 A^{\otimes}_{bind: p_1=a_1, \ldots, a_n} E_2(p_1, \ldots, p_n)$$

Apply-Merge extension ($A^M$): This is used to model assignment statements. The right child of the apply operator computes the values for attributes which are then assigned to (or merged with) the attributes present in the left child.

As described herein, r is a relation with schema $R=(\alpha_1, \ldots, \alpha_n)$, and e(r) is a parameterized single-tuple expression, whose result has the schema $S=(b_1, \ldots, b_m)$. As described herein, L is a sequence of assignments of the form $\alpha_1=b_1, \alpha_2=b_2, \ldots \alpha_k=b_k$. In an example embodiment, Apply-Merge r $A^{M(L)}$ e(r) can be defined procedurally as follows: for each tuple $t \in r$, evaluate $s=e(t)$. Then produce t' as an output tuple, where t' is obtained from t after performing the assignments specified in L. The operation algebraically can be defined as follows:

$$rA^{\otimes M(L)}e(r) = \Pi_x(rA^{\otimes}e(r))$$

where $X=r\cdot *-\{\alpha_1, \ldots, \alpha_k\}$, $b_1$ as $\alpha_1, \ldots, b_k$ as $\alpha_k$. The assignment list L is optional. When, omitted it is assumed to be of the form $r\cdot c_1=s\cdot c_1, \ldots, r\cdot c_k=s\cdot c_k$, where $c_1, \ldots, c_k$ are the attributes common to R and S.

For some embodiments, the above definition assumes e(r) to be exactly one tuple. If the r.h.s expression of an assignment statement results in more than one tuple, an exception is thrown. If it is empty, then it may either throw an exception, or perform no assignment and retain the existing value. In other embodiments, the semantics of assignment statements when e(r) is empty, or has more than one tuple, varies across systems, and it can be modelled accordingly.

Conditional Apply-Merge operator ($A_C^M$): r is a relation with schema $R=(\alpha_1, \ldots, \alpha_n)$, and $e_t(r)$ and $e_f(r)$ are parameterized single-tuple expressions and p(r) is a parameterized predicate expression. In an example embodiment, the Conditional Apply-Merge operation is defined as follows:

$$rA_C^M(p(r), e_t(r), e_f(r)) = rA^M(\sigma_{p(r)}(e_t(r)) \cup \sigma_{\neg p(r)}(e_f(r)))$$

This is used to model assignments within conditional branching constructs i.e., if-then-else blocks in the body of a UDF.

Example 1 (below) shows a query which invokes a UDF in its SELECT clause. The UDF returns the service level for a given customer. It executes a scalar SQL query to compute the customer's total business, which it then uses to decide the service level in a nested if-then-else block. The execution plan for queries such as the one in Example 1 on a commercial database system, is to invoke the UDF for each tuple. Such iterative plans can be very inefficient, since queries within the function body may be executed multiple times, once for each outer tuple.

These plans can be compared to correlated execution of parameterized nested subqueries. In the case of nested subqueries, decorrelation techniques have been well studied. The Apply operator may model correlated execution of subqueries, also presented transformation rules that can replace Apply operators by standard relational operations such as joins, under certain conditions, thereby decorrelating the query. Query decorrelation enables set-oriented execution plans by rewriting a nested query as a flat query. Once a query is decorrelated, the query optimizer can consider alternative join algorithms such as hash-join and merge-join, in addition to nested loops join.

Example 1 Query With a Scalar UDF

```
create function service level(int ckey) returns char(10) as
begin
    float totalbusiness; string level;
    select sum(totalprice) into totalbusiness
    from orders where custkey=ckey;
    if(totalbusiness > 1000000)
```

```
            level = 'Platinum';
        else if(totalbusiness > 500000)
            level = 'Gold' ;
        else
            level = 'Regular';
        return level;
    end
    Query:select custkey, service level(custkey) from customer;
```

However, decorrelating UDF invocations, such as the one in Example 1 is a more complex task due to the presence of various imperative constructs. Example 2 shows the same query after decorrelation of the UDF invocation. This transformed query enables set-oriented execution plans, thereby expanding the space of alternative plans for an optimizer.

Example 2 Decorrelated Form of Query in Example 1

```
    select c.custkey, case e.totalbusiness > 1000000: 'Platinum'
                     case e.totalbusiness > 500000: 'Gold'
                     default: 'Regular'
    from customer c left outer join e on c.custkey=e.custkey;
    where e stands for the query:
    select custkey, sum(totalprice) as totalbusiness
    from orders group by custkey;
```

Such transformations have not been addressed till now. The techniques exhibited here exists a large class of UDFs that can be decorrelated.

The first step towards decorrelating a UDF invocation is to construct a parameterized algebraic expression corresponding to the UDF. This expression is later merged with the expression tree of the calling query or function Example 3 UDF With a Single Arithmetic Expression

```
    create function discount(float amount) returns float as
    begin
        return amount * 0.15;
    end
    Query:select orderkey, discount(totalprice) from order;
```

Example 4 UDF With a Single SQL Query

```
    create function totalbusiness(int ckey)returns int as
    begin
        return select sum(totalprice) from orders
            where custkey =: ckey;
    end
    Query:select custkey, totalbusiness(custkey) from customer;
```

FIG. 1 illustrates an expression tree constructed for the UDF of Example 3 which contains a single statement returning the value of an arithmetic expression. The expression tree has one Apply operation whose left child is the Single relation, and the right child is a projection on the Single relation that computes the arithmetic expression. Finally there is a projection on the return value.

This expression is not in its simplest form, and can be further simplified. It shows a way to express scalar computations as relational expressions, and we demonstrates how this generalizes to any statement in the body of a UDF.

Figure 2:
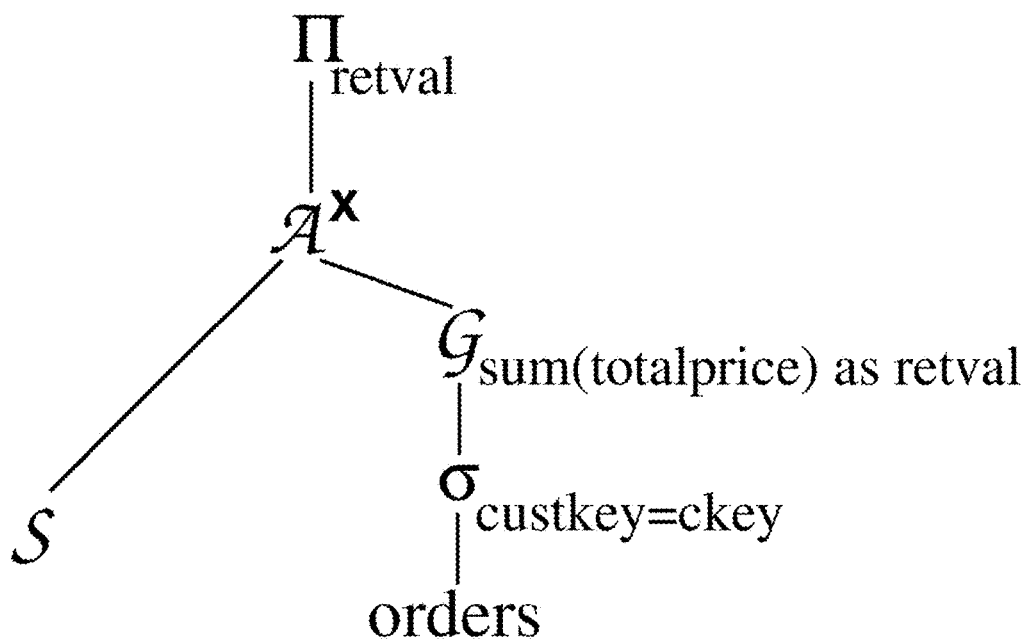
FIG. 2 shows an example expression tree for a UDF in accordance with an aspect of the present disclosure.

Similar expression trees can be constructed for statements with different kinds of expressions (logical, relational) and data types. Consider the query of Example 4, in which the UDF contains a single parameterized query execution statement. The expression constructed for Example 4 is illustrated in FIG. 2. Though many commercial database systems inline single statement UDFs such as Example 3 and Example 4 and optimize them. However, the present disclosure has taken these examples to illustrate the technique of building algebraic expressions for statements in UDFs.

The present disclosure proposes a general technique to algebraize arbitrary side effect free UDFs with conditional branching and other imperative constructs. The methods to handle UDFs without loops and with loops have been described here.

Some example embodiments use the control flow graph (CFG), a commonly used program representation, to explicitly capture control flow through the statements of a function. Each node in a CFG corresponds to a statement in the UDF. A directed edge between two nodes represents control flow. The CFG has a start node, from which execution begins, and an end node where execution terminates.

Figure 3:
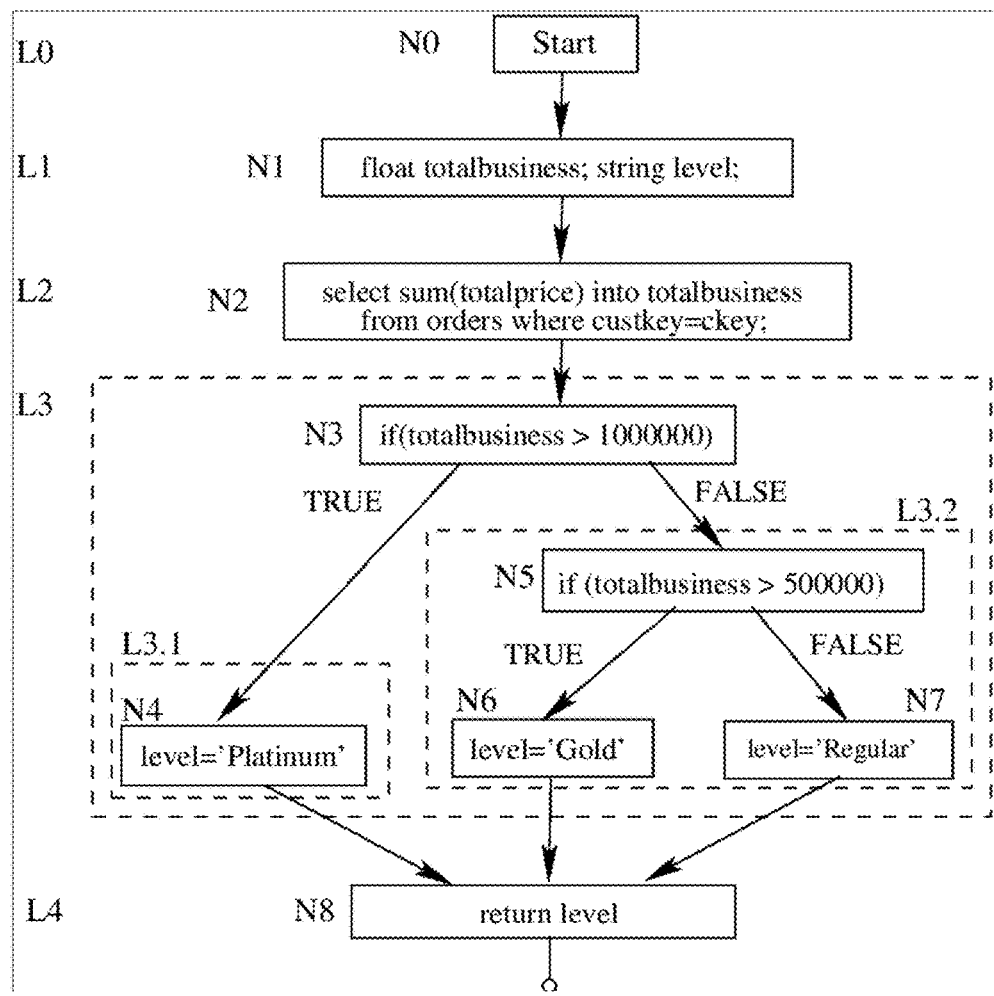
FIG. 3 shows an example flow chart of Control Flow Graph for a UDF in accordance with an aspect of the present disclosure.

In the example method, if-then-else blocks are logically treated as single nodes. Nested if-then-else blocks are treated as nested logical nodes. The CFG for the UDF in Example 1 is shown in FIG. 3 with nodes labelled $N_1, \ldots, N_8$. The logical nodes with nested if-then-else blocks are labelled $L_0, \ldots, L_4$, and shown in dashed boxes where applicable. The logical block $L_3$ has two nested logical blocks denoted as $L_{3.1}$ and $L_{3.2}$. As it can be seen, the resulting graph (considering top level logical nodes) would have no branching.

Each node $N_i$ in the CFG contributes to the expression tree. The contribution of node $N_i$ is denoted by $E_{N_i}$, and the contribution of a logical node $L_i$ is denoted by $E_{L_i}$. These contributions are computed as follows.

$$E_{L_i} = \begin{cases} S & \text{if } L_i \text{ is Start} \\ \prod_{r \text{ as } l}(S) & \text{if } L_i \text{ is an assignment } l = r \\ (p, e_t, e_f) & \text{if } L_i \text{ an if-then-else block} \end{cases}$$

The expression $E_{L_0}$ for the start node is the Single relation. An assignment statement of the form l=r is represented as a generalized projection on the Single relation. Here r can be a program expression, a scalar SQL query, or a UDF invocation. If r is a scalar SQL query, its relational expression is used. If it is an UDF invocation, an expression for the called UDF is first built, and then used in the projection. If an algebraic representation cannot be built for the called UDF, it is left as a function invocation. Variable declarations are treated as assignments with the r.h.s. as ⊥, i.e., the default uninitialized value for the data type.

An if-then-else block has two successors corresponding to the then and the else parts. In the example method, now recursively define the contribution of the if-then-else block as the set of expressions (p, et, ef). Here p is the predicate of the if statement, $e_t$ is the expression tree corresponding to the then branch (i.e., p is true), and $e_f$ is the expression tree corresponding to the else branch (i.e., p is false). This expressions (p, $e_t$, $e_f$) captures the contribution of the entire conditional block and hence the block can be logically seen as a single node in the CFG. All the contributions of individual nodes are then combined to get $E_{udf}$, the expression tree for the UDF as shown below.

$$E_{udf} = E_{L_0}$$

for i from 1, . . . , k do//k is the # of logical nodes $$o_i = \text{chooseApplyType}(L_i)$$

$$E_{udf} = E_{udf} A^{o_i} E_{L_i}$$

end $E_{udf}$ is initially assigned to $E_{L_0}$ corresponding to Start. Then, for every successive logical node $L_i$, an Apply operation is added whose left child is the expression built so far ($E_{udf}$), and right child is $E_{L_i}$.

The Apply operator's type $o_i$ depends on the corresponding node in the UDF. Variable declarations use the Apply-cross ($A^X$) operator. Assignment of values to previously defined local variables is algebraized using Apply-Merge ($A^M$). The assignment of results of a scalar query to scalar variables also uses Apply-Merge. Conditional branching nodes (i.e. if-then-else blocks) use the Conditional-Apply ($A_C$) operator. The return clause is mapped to an apply-cross ($A^X$) with a relational expression corresponding to the return expression. As a convention, return value is always alias to the name retval. Finally, a projection on retval is added to complete the expression for the UDF.

FIG. 3 illustrates the construction of the expression tree for the CFG. The expressions with their corresponding Apply operator types are as follows:

$$e_{L_1} = \Pi_{0 \ as \ totalbusiness, null \ as \ level}(S)$$

$$A^{o1} = A^X$$

$$e_{L_2} = \pi_v(G_{sum(totalprice) \ as \ v}(\sigma_{custkey=ckey}(orders)))$$

$$A^{o2} = A^{M totalbusiness = v}$$

$$e_{L_3} = (totalbusiness > 1000000, e_{L_{3.1}}, e_{L_{3.2}})$$

$$A^{o3} = A_C^M$$

Since $L_3$ is an if-then-else block, the expression $e_{L_3}$ is defined recursively in terms of the predicate at $N_3$, the true branch at $L_{3.1}$ and the false branch at $L_{3.2}$. The conditional-apply-merge operator is used. Since $L_{3.1}$ comprises of a single node $N_4$, its expression would be (S $A^X$ $e_{N_4}$) which is the same as $e_{N_4}$. In general, the expression for any logical node $L_i$ that comprises of a single node $N_j$ would be $e_{N_j}$ as shown in rule R1 of Table 1 that listed the additional equivalence rule.

TABLE 1

| R1 | r $A^X$ S = S $A^X$ r = r |
|---|---|
| R2 | r $A^M(\Pi_{a_1 \ as \ e_1, \ldots, a_k \ as \ e_k}(S)) = \Pi_{A, e_1 \ as \ a_1, \ldots, e_k \ as \ a_k}^d (r)$ where A denotes r. * -$\{a_1, \ldots, a_k\}$ |
| R3 | $\Pi_{f(B)} (\Pi_{g(A) \ as \ B}(r)) = \Pi_{f(g(A))} (r)$ |
| R4 | r $A^{M(L)}$ e(r) = $\Pi_X$(r $A^X$ e(r)) where e(r) is a single tuple expression, L is of the form: $a_1 = b_1, \ldots a_k = b_k$, and X denotes R-$\{a_1, \ldots, a_k\}$, $b_1$ as $a_1, \ldots, b_k$ as $a_k$ |
| R5 | $(\Pi_{a_1, \ldots, a_k, \ e_1 \ as \ b_1, \ldots e_m \ as \ b_m}^d (r)) A \overset{\circ}{\ast} e$ = $\Pi_{a_1, \ldots, a_k, \ e_1 \ as \ b_1, \ldots e_m \ as \ b_m, \ e.*}^d (rA \overset{\circ}{\ast} e)$ where e does not use any of the computed attributes $b_1, \ldots, b_m$. |
| R6 | r $A_C^M$ (p(r), $e_t(r)$, $e_f(r)$) = r $A^M$ ($\sigma_{p(r)}$ ($e_t(r)$) $\cup^{\circ}\neg_{p(r)}$ ($e_f(r)$)) where $e_t$ and $e_f$ are single tuple expressions |
| R7 | $\Pi_{e_1 \ as \ a}$ ($\sigma_{p_1}(r)$) $\cup \Pi_{e_2 \ as \ a}$ ($\sigma_{p_2}(r)$) = $\Pi_{(p_1?e_1:p_2?e_2) \ as \ a}$ (r) where $p_1 \wedge p_2$ = false |
| R8 | r $A_C^M$ (p(r), $e_t(r)$, $e_f(r)$) = $\Pi_{r.*,(p?e_t:e_f)}$ (r) where $e_t$ and $e_f$ are scalar valued expressions |

TABLE 1-continued

| R9 | r $A \overset{\circ}{\ast}_{bind:p_1= a_1, \ldots, p_n= a_n}$ e($p_1, \ldots, p_n$) = r $A \overset{\circ}{\ast} e(a_1, \ldots, a_n)$ |

The expression for $L_{3.2}$ which is another if-then-else block is defined in terms of $e_{N_6}$ and $e_{N_7}$. The remaining expressions are defined as below:

$$e_{L_{3.1}} = e_{N_4} = \Pi_{'Platinum' \ as \ level}(S)$$

$$e_{L_{3.2}} = (totalbusiness > 500000, e_{N_6}, e_{N_7})$$

$$A^{o3.2} = A_C^M$$

$$e_{N_6} = \Pi_{'Gold' \ as \ level}(S)$$

$$e_{N_7} = \Pi_{'Regular' \ as \ level}(S)$$

$$e_{N_4} = \Pi_{level \ as \ retval}(S)$$

$$A^{o4} = A^X$$

Figure 4:
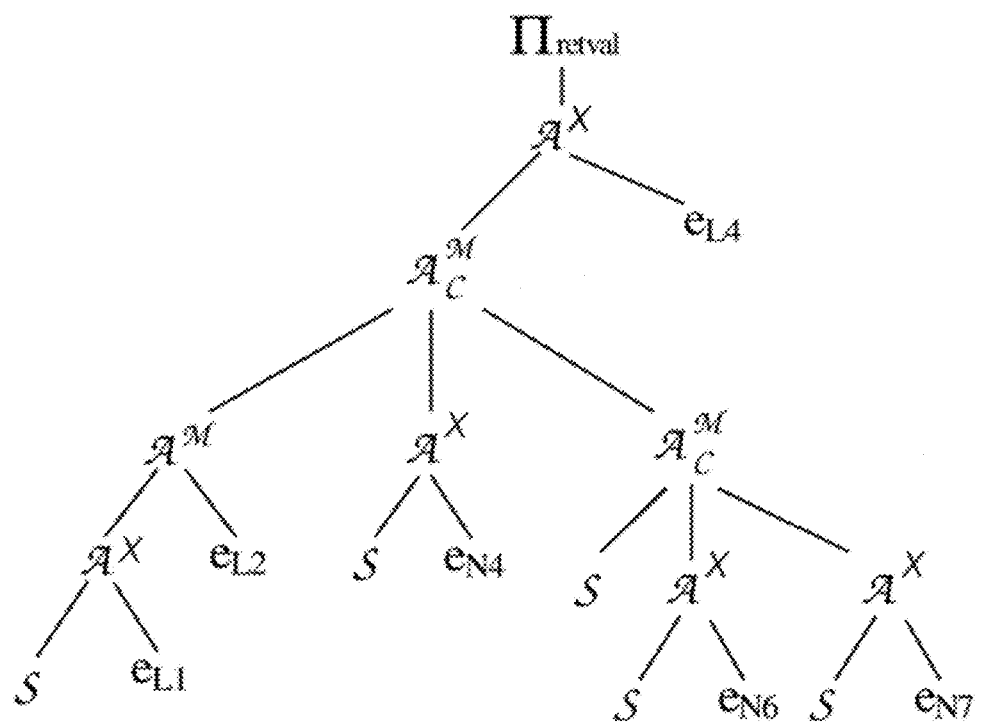
FIG. 4 shows an example expression tree for the CFG in FIG. 3 in accordance with an aspect of the present disclosure.

Using these expressions and the types of Apply operators, the tree is constructed as described. The resulting tree for the UDF in FIG. 3 is shown in FIG. 4. This tree can be further simplified and that would be considered as the removal of apply operators.

Figure 5:
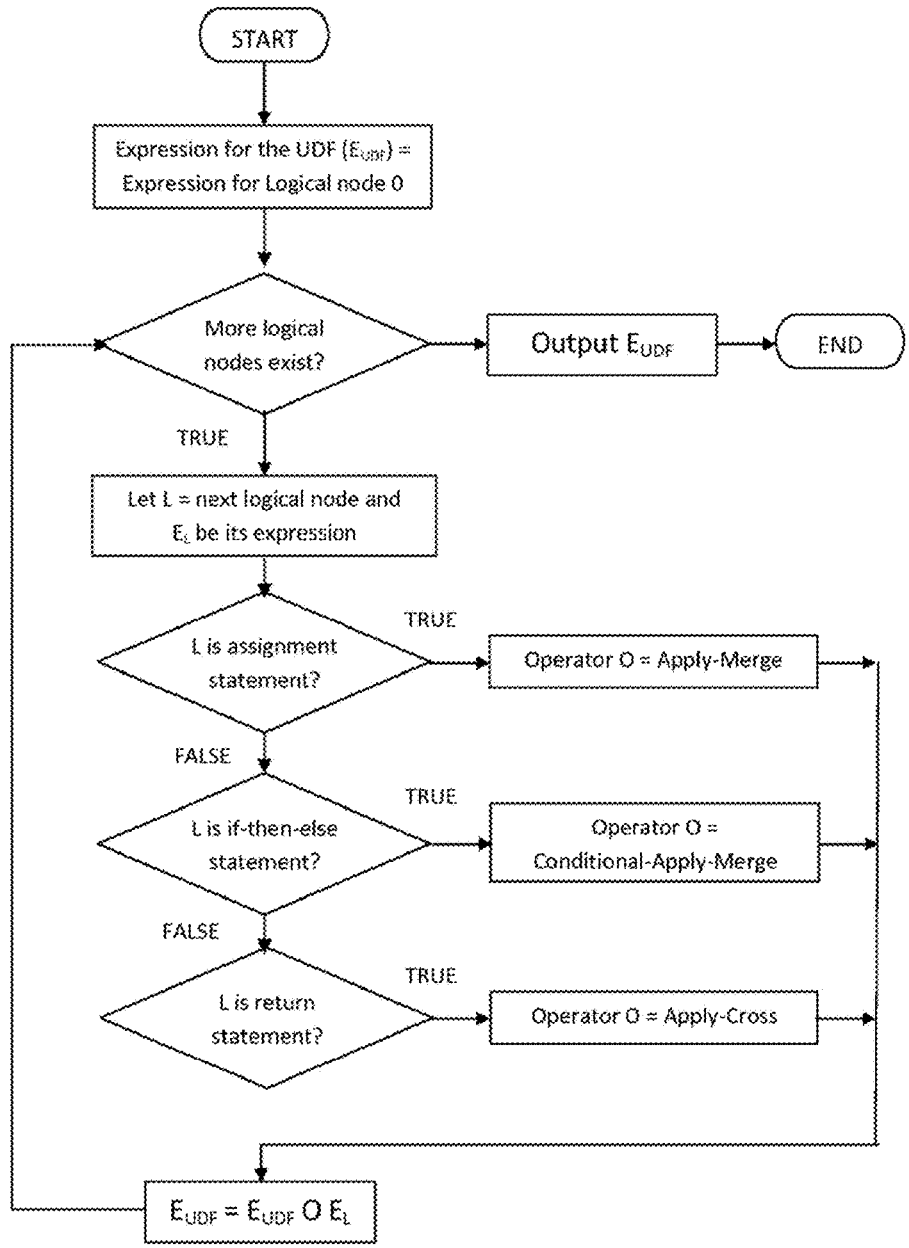
FIG. 5 shows a flowchart describing algebraization of a UDF in accordance with an aspect of the present disclosure.

FIG. 5 shows a flowchart describing algebraization of the UDF as mentioned above.

Once the expression tree is constructed for the UDF, it needs to be correlated with the query that invokes the UDF. This is very similar to the way nested subqueries are correlated with the outer query except for one key difference: the formal parameters of the UDF have to be bound to their corresponding actual parameters produced by each tuple of the outer query block. To this end, the enhanced Apply operation (Apply with the bind extension) is used to merge the expression tree of the outer query with the tree constructed for the UDF.

Figure 6:
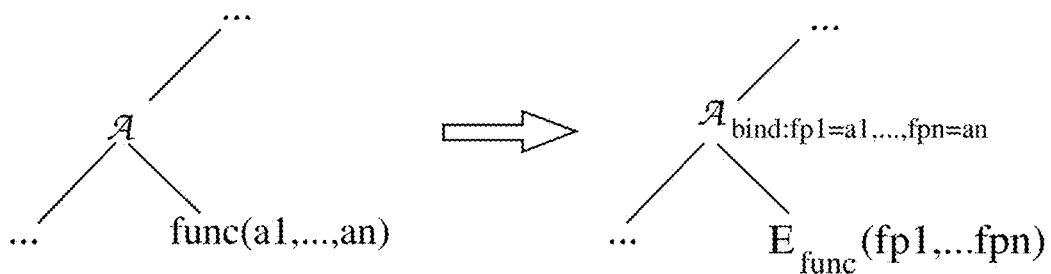
FIG. 6 shows merging of example expression trees in accordance with an aspect of the present disclosure.

$E_{outer}$ and $E_{udf}$ are the expression trees corresponding to the outer query block and the UDF respectively. Also, $f_{p1}, \ldots, f_{pn}$ denote the formal parameters of the UDF, and $\alpha_1, \ldots, \alpha_n$ denote attributes of $E_{outer}$ that are the actual parameters to the UDF. Irrespective of whether the UDF invocation is in the where clause or the select clause, $E_{outer}$ corresponds to the UDF invocation as the right child of an Apply operation as shown in the LHS of FIG. 6. Now, these are merged as follows:

1) The UDF invocation is replaced by its algebraic form ($E_{udf}$) as the right child of the Apply operator. In FIG. 6, the invocation $f_{unc}(p_1, \ldots, p_n)$ is replaced by its algebraic form $E_{func}$. The expression $E_{func}$ is parameterized by formal arguments $f_{p1}, \ldots, f_{pn}$.

2) The list of parameter mappings of the form $f_{p1} = \alpha_1, \ldots, f_{pn} = \alpha_n$ is passed to the Apply operator (with the bind extension) as illustrated in FIG. 6. These assignments are performed by the Apply operator before evaluating its right child ($E_{udf}$).

A merged expression trees for the UDF and its calling query block have been constructed now. Further the method describes how to remove the Apply operators and also the method to simplify this tree is shown.

The Apply operators present in the merged query tree are removed using the equivalence rules and additional equivalence rules presented here. For completeness, some of the known equivalence rules are listed (rules K1-K6) in Table 2.

TABLE 2

| | |
|---|---|
| K1 | $r A^{\otimes} e = r^{\otimes}_{true} e$, if e uses no parameters from r |
| K2 | $r A^{\otimes}(\sigma_p(e)) = r^{\otimes}_p e$, if e uses no parameters from r |
| K3 | $r A^{\times}(\sigma_p(e)) = \sigma_p(r A^{\times} e)$ |
| K4 | $r A^{\times}(\Pi_v(e)) = \Pi_{v \cup schema(r)}(r A^{\times} e)$ |
| K5 | $r A^{\times}(_A G_F(e)) = A_{\cup schema(r)} G_F(r A^{\times} e)$ |
| K6 | $\Pi_{f(A) as a_0, a_1, \ldots, a_n}(r) = \Pi_{a_0, a_1, \ldots, a_n}(r A^{\times} P_{a_0}(f(A)))$ |

Equivalence rules (R1-R8) given in Table 1 are described below can be used in order to express extended Apply operations in terms of standard Apply or other relational operations. This enables application of known rules, thereby simplifying and decorrelating the expression. Rules R1-R8 is described briefly here. r is a relation with schema $R(\alpha_1, \ldots, \alpha_n)$.

Rule R1: This rule removes the Apply-cross operator when one of its children is Single.

$$r A^X S = S A^X r = r$$

i.e., if one of the children of an $A^X$ is the Single relation and the other child is r, the result of the operation is r.

Rule R2: This rule enables the removal of Apply-merge when its right child is a projection on Single.

$$r A^M (\Pi_A(S)) = \Pi_{B,A}{}^d(r)$$

Where A=(e1 as $\alpha 1, \ldots, e_k$ as $\alpha_k$) and B=R-$\{\alpha_1, \ldots, \alpha_k\}$ i.e., if the inner expression of an $A^M$ is a projection on Single, then the operation can be written as a projection on r with common attributes being projected as from Single.

Rule R3: The function composition rule for the generalized projection operator where f and g are pure functions:

$$\Pi_{f(B)} \Pi_{g(A) as B}(r)) = \Pi_{f(g(A))}(r)$$

Rule R4: Apply-merge removal. This rule follows from the definition of Apply-merge.

Rule R5: Move a projection after the Apply.

$$(\Pi_A{}^d(r)) A^{\otimes} e = \Pi_A{}^d(r A^{\otimes} e)$$

Where A=$(\alpha_1, \ldots, \alpha_k, e_1$ as $b_1, \ldots e_n$, as $b_m)$, and $\{b_1, \ldots, b_m\}$ are computed on r. This rule holds provided the inner expression e of the Apply does not use any computed attributes $\{b_1, \ldots, b_m\}$ of the outer expression.

Rule R6: Conditional-Apply removal. This rule follows from the definition of Conditional-Apply.

Rule R7: Union to generalized projection. A union between expressions with mutually exclusive selection predicates can be written as a generalized projection with a conditional expression.

$$\Pi_{e_1} as\ a(\sigma_{p_1}(r)) \cup \Pi_{e_2} as\ a(\sigma_{p_2}(r)) = \Pi_{(p_1?e_1:p_2?e_2)} as\ a(r)$$

Rule R8: This rule can be derived from rules R6 and R7 to express Conditional-Apply as projection directly, whenever $e_t(r)$ and $e_f(r)$ are scalar valued.

Rule R9: Apply-bind removal. An Apply operation with bind extension can be removed by replacing all occurrences of formal parameters $(p_1, \ldots, p_n)$ in its right child by actual parameters $(\alpha_1, \ldots, \alpha_n)$.

$$r A_{bind:p_1=\alpha_1, \ldots, p_n=\alpha_n}{}^{\otimes} e(p_1, \ldots, p_n) = r A^{\otimes} e(\alpha_1, \ldots, \alpha_n)$$

This can be written using the Apply operator (rule K6) as:

$$E_{outer} = \Pi_{orderkey,d}(orders\ A^X \rho_d\ (discount(totalprice)))$$

Figure 7:
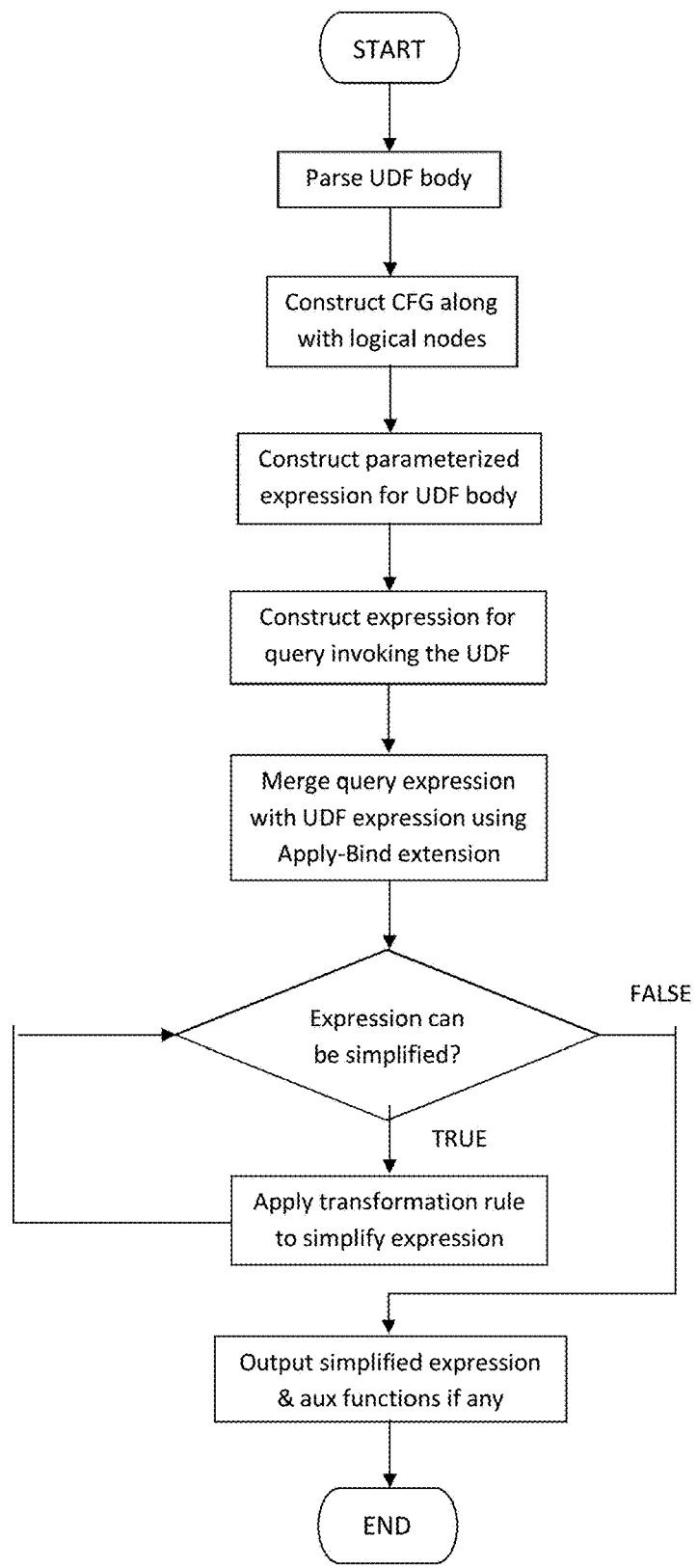
FIG. 7 shows an example flowchart for a method in accordance with an aspect of the present disclosure.

FIG. 7 illustrates the overall procedure described above in a flowchart. It depicts the UDF Decorrelation procedure.

We now illustrate the construction of the merged query tree and removal of Apply operators for the examples we have been considering so far. First, consider the query in Example 3. For this example, $E_{outer}$ is given by:

$$E_{outer} = \Pi_{orderkey,discount(totalprice)\ as\ d}\ (orders)$$

This can be written using the Apply operator (rule K6) as:

$$E_{outer} = \Pi_{orderkey,d}(orders\ A^X \rho_d(discount(totalprice)))$$

Figure 8:
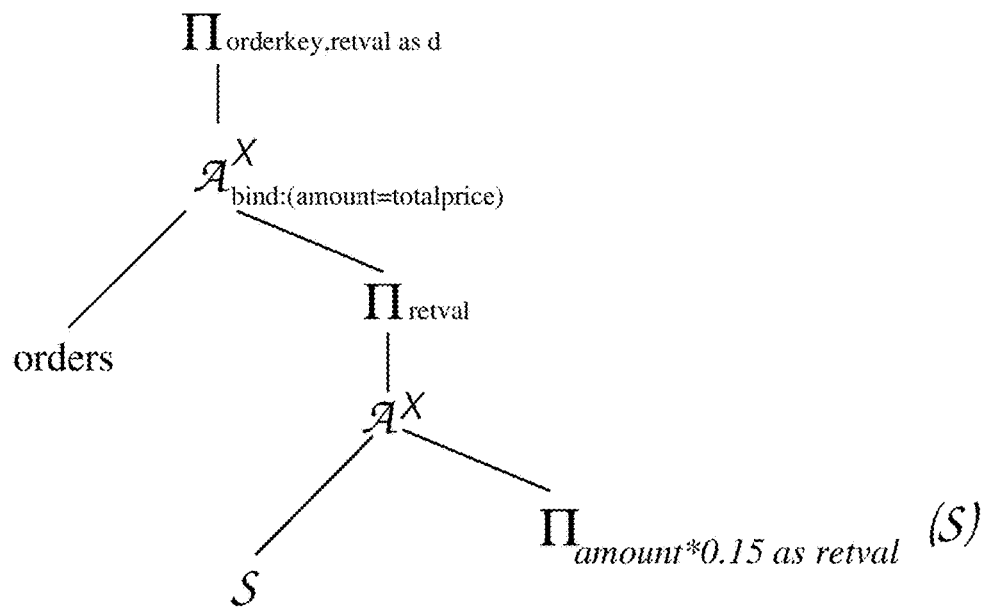
FIG. 8 shows an example merged expression tree for a query in accordance with an aspect of the present disclosure.

The expression for the UDF, $E_{udf}$ is shown in FIG. 1 and the merged query tree is shown in FIG. 8. This merged expression can be now simplified and the Apply operators removed by using rules in Table I and Table II. Applying rule K4 and R1 for the innermost Apply operator, the below expression is emerged:

$$\Pi_{orderkey,retval\ as\ d}(orders\ A_{(amount=totalprice)}{}^X \Pi_{amount*0.15\ as\ retval}(S))$$

Note that the above expression still uses the formal argument amount, which is replaced by the actual argument when the Apply operator (with bind extension) is removed (rule R9). Applying rule K4 and R1 again, the final expression is found:

$$\Pi_{orderkey,totalprice*0.15\ as\ d}(orders)$$

Queries that invoke a UDF in their WHERE clause can be handled in a similar manner. For example, consider the following query that invokes the same UDF of Example 3 in its WHERE clause:

Select order key from orders where discount(total price) >100;

This query is initially represented as follows:

$$E_{outer} = \Pi_{orderkey}(\sigma_{d>100}(orders\ A^X \rho_d(discount(totalprice))))$$

Merging this with the expression for the UDF gives the below expression:

$$\Pi_{orderkey}(\sigma_{d>100}(\beta_d(e)))$$

Where e is the expression in FIG. 8. After simplification, the final expression is:

$$\Pi_{orderkey}(\sigma_{retval>100}(\Pi_{orderkey,totalprice*0.15\ as\ retval}(orders)))$$

Consider the query of Example 4. The query is initially represented as:

$$E_{outer} = (\Pi_{custkey,v}(customer\ A^X \rho_v(totalbusiness(custkey)))$$

The expression for the UDF is shown in FIG. 3. Merging them, gives the below expression:

$$\Pi_{custkey,v}(customer\ A^X \rho_v(S\ A^X e))$$

where $e = \Pi_{retval}\ (_{\emptyset}\ G_{sum\ (totalprice)\ as\ retval}\ (\sigma_{custkey=ckey}\ orders)))$ Applying rule R1 and simplifying, giving below expression, $$\Pi_{custkey,v}(customer\ A^X \emptyset_{sum(totalprice)\ as\ v}(\sigma_{custkey=ckey}\ orders))$$

Transformations described above can then be used to remove the correlation and obtain the following expression as one of the equivalent forms.

$$\Pi_{custkey,v}(customer\ \bowtie\ (_{custkey}\ \emptyset_{sum(totalprice)\ as\ v}(orders)))$$

Consider the UDF and query of Example 1. The query is initially represented as:

$$E_{outer} = \Pi_{custkey,v}(customer\ A^X \rho_v(service\_level(custkey))$$

The parameterized expression $E_{udf}$ constructed for the UDF is shown in FIG. 5. Here, $p_1$ and $p_2$ are the predicates (totalbusiness>1000000) and (totalbusiness>500000) respectively. After applying rule R1 on $E_{udf}$, gives below expression:

$$E_{udf} = \Pi_{level\ as\ retval}(T_1 A_C^M(p_1, e_{N_4}, T_2))$$

where $T_1 = e_{L1} A^M e_{L2}$ and $T_2 = S A_C^M(p_2, e_{N6}, e_{N7})$. Using rule R4, K4 and R1, $T_1$ can be simplified to:

$$T_1 = \Pi_{totalbusiness,null\ as\ level}(e_{L2})$$

Using rule R8, gives: $T_2 = A_C^M\ p2?eN6:eN7\ (S)$. Merging $E_{udf}$ with $E_{outer}$ and simplifying with rule K4, gives below expression:

$$\Pi_{custkey,v}(\Pi_{totalbusiness,null\ as\ v}(T_3) A_C^M(p_1, e_{N_4}, T_2))$$

where $T_3 = (customer\ A^X\ e_{L2})$. Using the transformations, gives below expression:

$$T_3 = (customer \bowtie (_{custkey} \mathcal{G}_{sum(totalprice)\ as\ totalbusiness}(orders)))$$

Applying rule R8 to the merged expression, gives the following final simplified expression. The SQL query corresponding to this expression is given in Example 2:

$$\Pi_{custkey,(p1?'Platinum':p2?'Gold':'Regular')\ as\ v}(T_3)$$

UDFs with Loops

Loops are encountered often in UDFs and generally iterate over cursors defined on query results. Example 5 shows a query on the TPCH schema which invokes the UDF totalloss, with a cursor loop in it. For a given supplier, this query lists out the parts along with the total loss incurred on the sales of that part. The cursor in the UDF iterates over each line item with the specified part, and computes the profit gained. If the profit is less than zero, i.e., it is a loss, then it is accumulated in the total_loss variable.

Example 5 UDF with a Loop

```
create function totalloss(int pkey) returns int as
begin
    int total_loss = 0;
    int cost = getCost(pkey);
    declare c cursor for
        select price, qty,disc from lineitem
        where partkey=:pkey;
    open c;
    fetch next from c into @price, @qty, @disc;
    while @@FETCH_STATUS = 0
        int profit = (@price-@disc) - (cost * @qty);
        if (profit < 0)
            total_loss = total_loss - profit;
        fetch next from c into @price, @qty, @disc;
    close c; deallocate c;
    return total_loss;
end
Query: select partkey, totalloss(partkey)
       from partsupp where suppkey = ?;
```

Loops result in a cycle in the control-flow graph of the UDF, making the task of algebraizing them challenging and, in some cases, impossible. Since queries involve disk 10, one of the goals is to decorrelate any queries inside a UDF with respect to the outer query block. Now, the disclosure describes techniques to decorrelate scalar and table valued cursor loops. In an example embodiment this example method can be extended to arbitrary while loops Algebraizing Cursor Loops The first step to building an expression for a cursor loop is to build an expression for the body of the loop. The body of a loop may contain imperative statements, query execution statements and nested loops, with arbitrary data dependences between them. Such inter-statement data dependences are captured by a data dependence graph (DDG) using static analysis of the code. The key difference between statements in a loop body and other statements which are not part of a loop is that statements in a loop may have cyclic data dependences i.e, loops may result in cycles in the DDG. For instance, consider the loop in Example 5. The value of variable total_loss, written in an iteration say i, is read in the subsequent iteration i+1, resulting in a cyclic data dependence.

The parameterized expression for a loop with no cyclic data dependences is built as follows. $E_c$ is the expression for the query on which the cursor is defined, and $E_b$ is the expression for the body of the loop. Expression $E_b$ is constructed using the technique described above. Then the expression for the loop is:

$$E_l = (S\ A^X E_c) A^M E_b$$

The presence of cyclic dependences in a loop makes it impossible to construct a set oriented algebraic expression for the loop in its given form. However, cyclic dependences are quite commonly encountered in loops in UDFs. The disclosure now describes how to compute the expression $E_b$ for the body of a loop with cyclic data dependences.

Consider the subgraph of CFG corresponding to the statements in the body of a loop. The logical nodes in this subgraph are $L = L_1, \ldots, L_k$. Here, $L_i$ is the first node in L that is part of a cycle of data dependences.

Then, the contribution of nodes $L_i, \ldots, L_k$ (referred to as $L_c$) can be captured as a user defined aggregate function if the following conditions hold:

The initial values of all variables written in $L_c$ are statically determinable. This is because initial values have to be supplied to aggregate functions, at function creation time; and The query on which the cursor is defined does not have an ORDER BY clause, or the database allows enforcement of order while invoking user defined aggregates.

Here, $E_{in}$ is the expression at the point that precedes Li. $E_{in}$ is constructed as described earlier (the fetch next statement is treated as an assignment and modelled accordingly). Then the expression constructed for the body of the loop L is:

$$E_b = \mathcal{G}_{f_c(\ )}(E_{in})$$

Where $f_c$ is the auxiliary function created for nodes $L_c$. Function $f_c$ is a tuple-valued aggregate function with the signature:

$$\text{TUPLE}(c_1, \ldots, c_k) f_c(b_1, \ldots, b_m)$$

where (i) $c_1, \ldots, c_k$ are the variables that are live at the end of loop L, and (ii) $b_1, \ldots, b_m$, are the attributes that are used by statements in $L_c$. The body of $f_c$ is constructed using the statements in $L_c$. Nested loops are not considered in the above description, but can be handled similarly.

The above transformation may be performed if the following conditions hold:

The initial values of all variables written in $L_c$ are statically determinable. This is because initial values have to be supplied to aggregate functions at creation time; and The query on which the cursor is defined does not have an ORDER BY clause, or the database allows enforcement of order while invoking user defined aggregates.

In the loop of Example 5, the cyclic dependence is present in the following logical node:

```
if (profit < 0)
    total_loss = total_loss - profit;
```

The expression is computed up to this logical node as described earlier. The variable total_loss is the only variable written to in this node, and its initial value can be statically determined to be 0. Therefore this logical node is expressed as a user defined aggregate function that accepts profit as its parameter, and returns total_loss.

User defined aggregate functions should support a set of methods that are invoked at different stages during their evaluation. In particular, they should support an initialization method where initial values are set, an accumulate or iterate method that accumulates individual input values, and a terminate method that returns the aggregate value. For Example 5, the technique results in a user defined aggregate function aux-agg( ) shown below. Observe that in some embodiments the accumulate method contains the same code as the logical node with a dependence cycle.

Implementation of function aux-agg( ):

```
State: int total_loss;
void initialize( )
begin
    total_loss = 0;
end
void accumulate (int profit)
begin
    if (profit < 0)
        total_loss = total_loss - profit;
end
int terminate( )
begin
    return total_loss;
end
```

Figure 9:
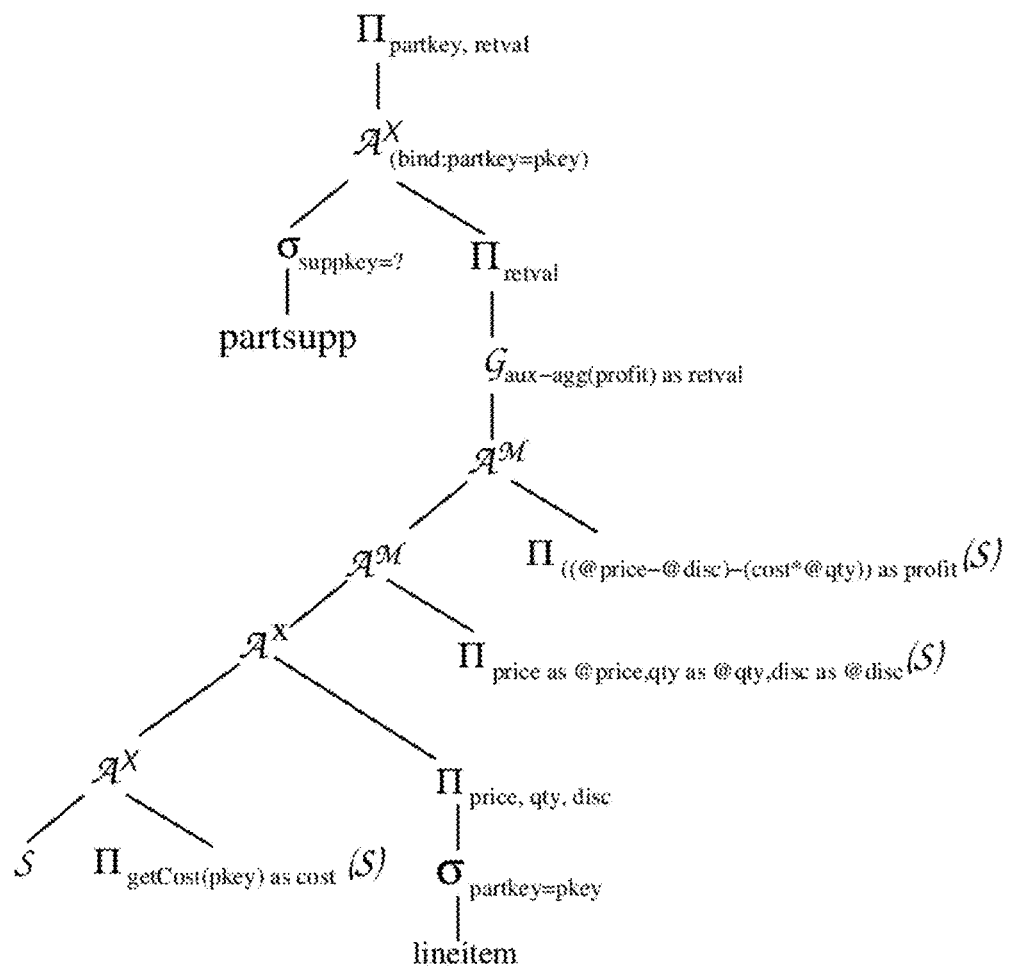
FIG. 9 shows an example expression tree in accordance with an aspect of the present disclosure.

The final expression constructed for the query in Example 5 is shown in FIG. 9 where the function aux-agg( ) is the user defined aggregate. Merging the expression tree with the outer query block and removing correlations is done as described above.

In this approach, all the statements are moved in $L_c$ into an aggregate function. In other words, all the statements in the loop that follow $L_i$ (the first statement that is a part of a dependence cycle) are considered for the user defined aggregate. However, there could be statements in $L_c$ that are not part of any dependence cycle. In such cases, it may be possible to reorder statements in the loop such that $L_c$ contains only statements that are part of a dependence cycle, or statements dependent on them. Some embodiments may include or may be capable of including such optimization.

Algebraizing Table Valued UDFs

Table valued UDFs that build and return a temporary table are encountered very often in applications. Such UDFs typically look like the one shown in Example 6. This UDF creates a temporary table, iterates over a cursor and inserts values into a temporary table in every iteration before returning the table.

Table valued UDFs can be represented algebraically using an example embodiment if the loop does not contain cyclic data dependences, there are no updates or deletes to the table valued attribute (only inserts are present), and the table valued attribute is not modified both before and after the loop.

Example 6 Table Valued UDF with a Cursor Loop

```
create function some function( ) returns tt table(...) as
begin
    declare c cursor for ...
    open c;
        fetch next from c into ...
        while@@FETCH_STATUS = 0
        // compute attributes of table tt
        insert into tt values(...);
        fetch next from c into ...
    close c; deallocate c;
    return tt;
end
```

The expression for the cursor loop is built as described by the techniques herein. The statement that inserts values into the temporary table is algebraized by using a projection on the attributes of the temporary table.

In the UDF of Example 6, $E_c$ is the expression for the query on which the cursor is defined. Here, $(a_1, a_2, \ldots)$ are the attributes of the temporary table tt, and $E_b$ is the expression for the code that computes the values $(@v_1, @v_2, \ldots)$ that are inserted into tt. Then, the expression for the UDF is:

$$(((S\,A^X E_c) A^M E_b) A^X \Pi_{v_1 as\ a_1, v_2 as\ a_2, \ldots}(S))$$

The methods presented in this section are used to build algebraic representation for scalar or table valued UDFs with cursor loops. This covers a large class of UDFs commonly encountered in practice. These methods can be further extended to handle loops with a dynamic iteration space, such as arbitrary while loops. One of the objectives of the methodology described herein is to decorrelate any queries inside a loop, since they involve disk IO. In these cases, techniques such as loop fission can be extended to isolate query execution statements into separate loops. Then, the query execution statements can be decorrelated, while the rest of the loops could remain as auxiliary UDFs, since they may have cyclic dependences that may make it impossible to construct set-oriented algebraic expressions.

The present disclosure may be used with any database that supports UDFs and standard decorrelation transformations. The extensions and equivalence rules disclosed here can be integrated with the query optimizer to enable decorrelation of UDF invocations.

Since limited access to such a query optimizer, these techniques was implemented as a query rewrite tool instead which can be used as a pre-processor for a database system. The tool accepts a database schema, an SQL query, and definitions of UDFs used by the query, written in the syntax of a commercial database system (SYS1), as its inputs. It produces as output a rewritten SQL query along with definitions of auxiliary functions, if any, used by the rewritten query. The rewritten SQL query is then executed on the database system, which performs cost-based optimization on the query.

Figure 10:
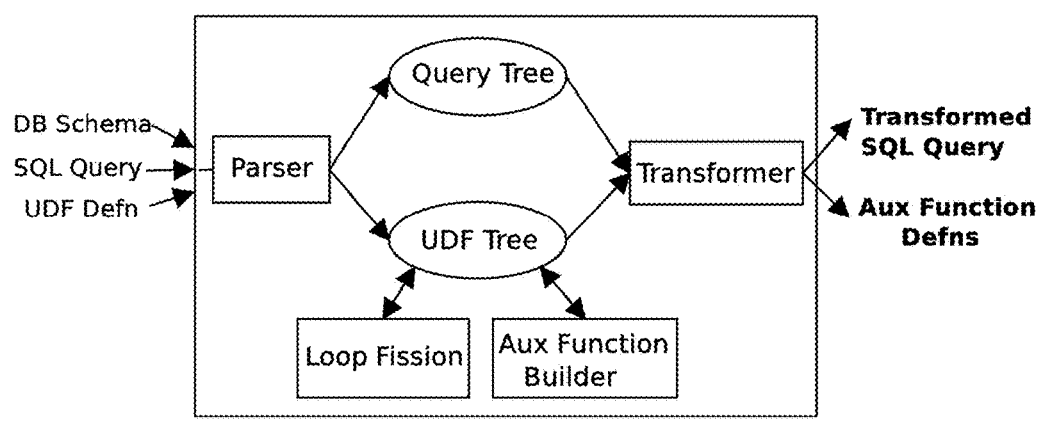
FIG. 10 shows an example design of query rewrite tool in accordance with an aspect of the present disclosure.

The structure of the rewrite tool is shown in FIG. 10. After parsing, a tree structured intermediate form of the query and the referenced UDFs are constructed. If the UDF contains loops, the loop fission module may be used to perform the necessary transformations while the tree is built. This tree makes use of Apply operators with extensions as disclosed herein. The aux function builder is invoked as required to generate auxiliary functions. Transformation rules that remove the Apply operators are then applied to the intermediate tree form. If the tool is unable to remove all the Apply operators, it does not transform the query. Finally, the output phase generates a SQL query and auxiliary functions from the transformed intermediate representation.

In an example embodiment, a system can be designed to assess (a) the applicability of the methods and systems described herein to real-world UDFs, and (b) the performance benefits due to the rewrite on modern commercial database systems. To the best of knowledge, there is no benchmark for SQL where queries make extensive use of UDFs. To assess the applicability of the rewrite techniques disclosed here, real world applications can be constructed and borrowed from UDFs that make use of various constructs offered by a typical imperative language. The program logic in most of these UDFs is influenced by functions and procedures found in real-world applications, and changes were made primarily for running them against the TPCH dataset.

Example 7 UDF for System 1

```
create function discount(float amt, int ckey) returns float as
begin
    int custcat; float catdisct, totaldiscount;
    select category into :custcat
    from customer where customerkey = :ckey;
    select frac_discount into :catdisct
    from categorydiscount where category = :custcat;
        totaldiscount = catdisct * amt;
    return totaldiscount;
end
Query: select orderkey, discount(totalprice, custkey) from order;
```

The example systems described below may be performed on two widely used commercial database systems—SYS1 and SYS2. The system can generate the decorrelated queries for SYS1, and manually translate to the syntax of SYS2 in order to assess the applicability and performance benefits. The database servers may be run on Intel Core i5 3.3 Ghz machines with 4 GB of RAM. The queries may be run locally on the TPC-H 10 GB dataset with a few augmented attributes to suit the methods described herein. The tables customer and orders consist of 1.5 million and 15 million records respectively, with default indices on primary and foreign keys.

Figure 11:
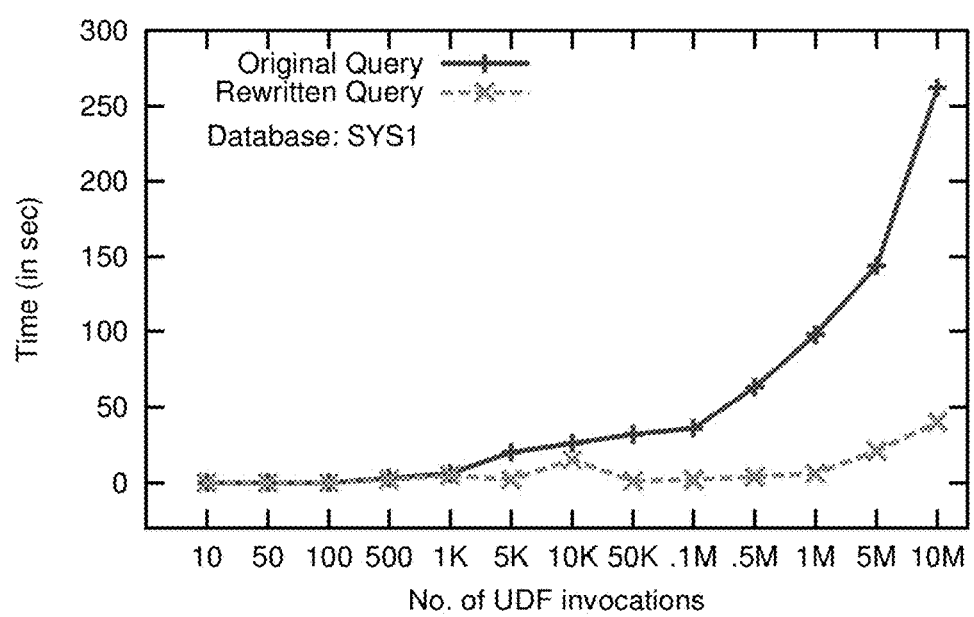
FIG. 11 shows a result of an example embodiment in accordance with an aspect of the present disclosure.

As one example, consider system 1 for a straight line UDF which computes the discount for a customer based on the category of the customer. The UDF and the query are shown in Example 7. This UDF executes two scalar SQL queries and an arithmetic operation in order to compute the discount value. Using these techniques, along with the transformation rules, given the following decorrelated form for the query of Example 7:

select o orderkey, (frac_discount*o_totalprice) as totaldiscount
    from orders o, customer c, categorydiscount cd
    where      o_custkey=c      custkey      and c_nationkey=custcatgeory FIG. 11 shows the results of example system 1 on SYS1 with the number of UDF invocations on the x-axis and the time taken on the y-axis. The disclosed techniques vary the number of UDF invocations by using a top clause. It is seen that for smaller number of invocations, both the original and the rewritten query perform similarly. The optimizer performed an iterative invocation of the UDF for the original query; it chose a plan with nested loop joins for the rewritten query. However, as the number of invocations increase, the time taken by the original query steadily increases. This is because the optimizer does not have alternative plans to choose, and uses the same iterative plan. In contrast, the time taken by the rewritten query remains very low even with a larger sizes as the optimizer chose other plans with hash join. This shows how our transformations enable the optimizer to choose better plans. Similar patterns were observed on SYS2 though the actual numbers vary. For instance, at 1 million invocations, the time taken by the original query and there written were respectively 6 minutes and 14 seconds. At 10 million invocations, the original query took 16 minutes whereas the rewritten one ran in 2 minutes.

As another example, consider system 2 for the query and UDF shown in Example 1 with its rewritten form in Example 2. Recall that this UDF has assignment statements, branching statements and a scalar SQL query.

Figure 12:
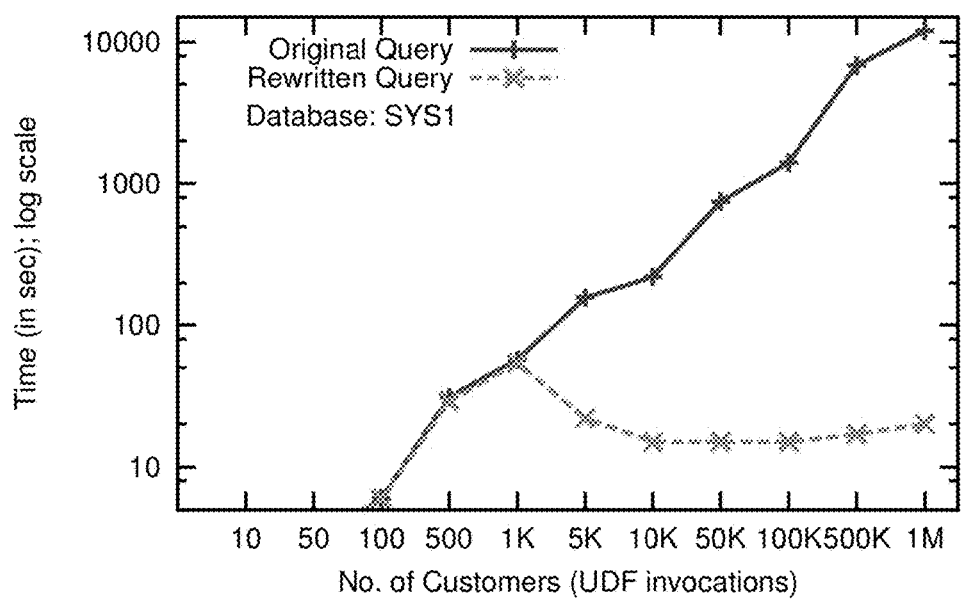
FIG. 12 shows a result of an example embodiment in accordance with an aspect of the present disclosure.

The techniques vary (by appending a where clause) the number of customers, and hence the number of UDF invocations, and report the time taken by the original and transformed queries. The results on SYS1 for example system 2 are shown in FIG. 12 with the UDF invocation count on the x-axis and the time taken (in log scale) on the y-axis.

The observations here are similar to what were observed in example system 1. Observe that up to 1K invocations, both the original and transformed queries perform similarly. For the original query, the optimizer chose a plan which iteratively invokes the UDF for each tuple in the customer table. In the case of the transformed query, the optimizer chose a nested loops join, thus resulting in similar performance. As the number of customers increase, the original query plan remains the same, and hence performance degrades. For the rewritten query, the time taken actually reduces between 1K and 10K before starting to raise very gradually for invocations beyond 10K. This drop is due to the fact that up to 1K, the chosen plan had two nested loop join operations. Between 1K to 5K, one of them switches to a hash join; between 5K to 10K, the second one also switches to a hash join. At 10 million customers, the original query took more than 3 hours whereas the rewritten query ran in less than a minute. On SYS2, the rewritten query took about 9 minutes while the original query ran for almost 24 hours.

Figure 13:
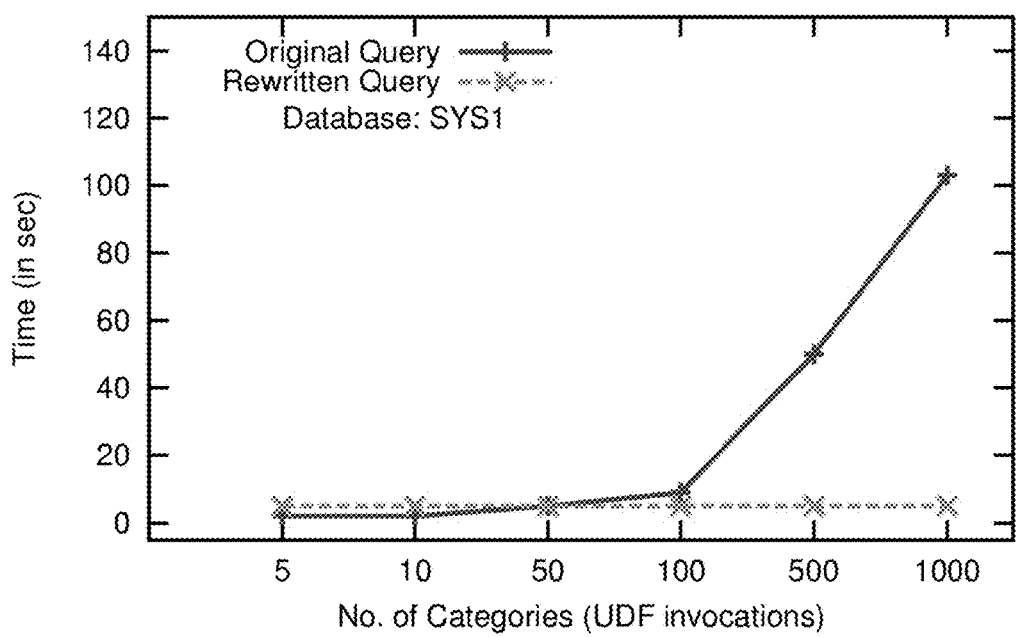
FIG. 13 shows a result of an example embodiment in accordance with an aspect of the present disclosure.

As yet another example, consider system 3 for a UDF with a loop. The UDF computes the number of parts in a given category and all its parent categories. The parts table had 2 million rows and there were 1000 categories. In some embodiments, the transformation rules, disclosed herein, may be applied manually. Similar to example system 2, the described techniques vary the number of UDF invocations by appending a where clause on the categories table, and record the time taken. The results of this example system 3 on SYS1 are shown in FIG. 13, where the x-axis indicates the number of UDF invocations and y-axis shows the time taken.

Similar to the other example systems, the time taken by the original query in this case increases as the number of invocations increases. It is realized that for smaller number of invocations, the transformed query actually performs a bit worse than the original query. In fact, as the graph shows, the time taken by the rewritten query is a constant (at 5 seconds). This is due to the fact that the scan on the parts table dominates the query execution time, and the selection predicate on categories does not reduce this.

The embodiments described here of decorrelating UDFs are designed to be part of a cost based optimizer. If an optimizer incorporates these techniques, it can choose the better of the two plans for smaller number of invocations, since iterative invocation remains as an alternative. Since our current implementation is an external tool, this option is not available to the optimizer. At larger number of invocations, however, the rewritten form turns out to be significantly faster than the original query.

Figure 14:
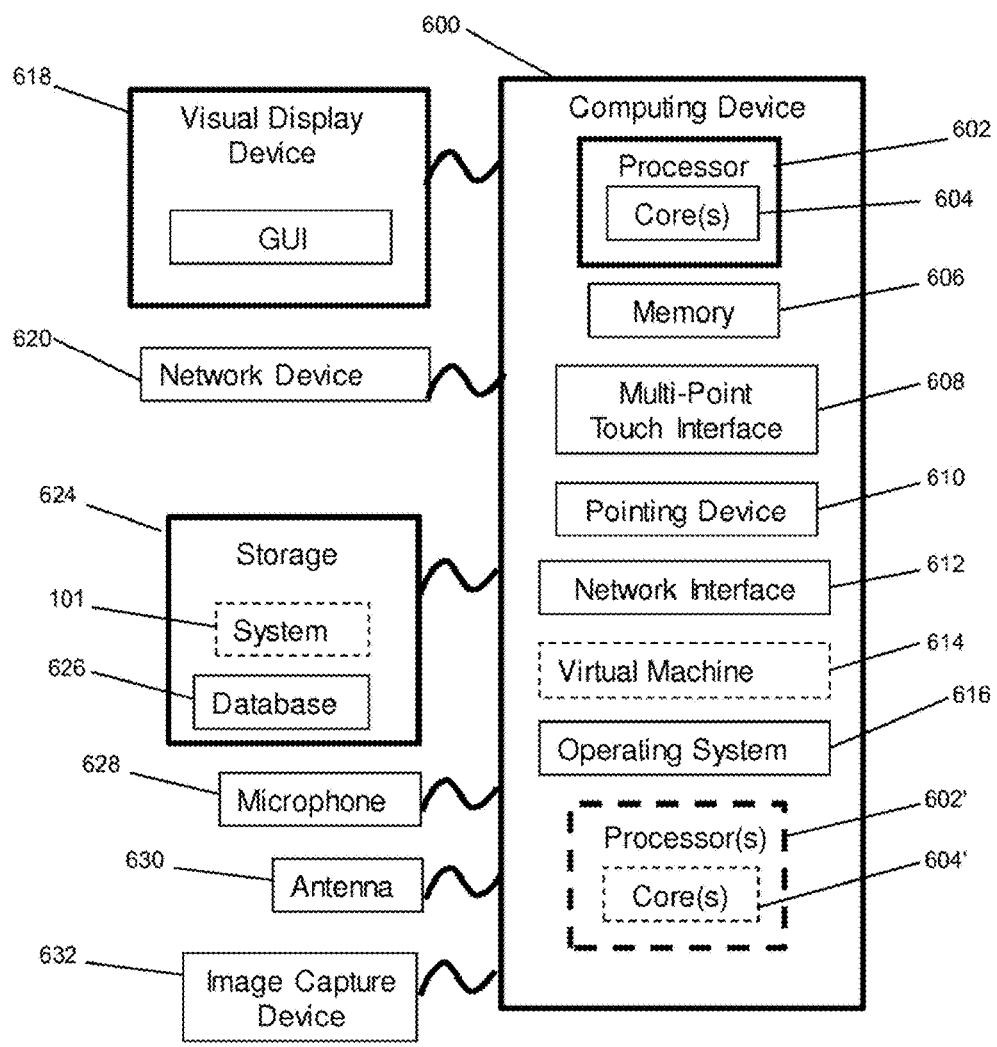
FIG. 14 shows a computing device of an example embodiment in accordance with an aspect of the present disclosure.

FIG. 14 is a block diagram of an exemplary computing device 600 that may be used to implement exemplary embodiments of a UDF transformer or decorrelater system 101, as described herein. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of the UDF transformer system 101. The computing device 600 also includes configurable and/or programmable processor 602 and associated core 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor.

Virtualization may be employed in the computing device 600 so that infrastructure and resources in the computing device may be shared dynamically. A virtual machine 614 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing device 600 through a visual display device 618, such as a computer monitor, which may display one or more graphical user interfaces 112 that may be provided in accordance with exemplary embodiments. The computing device 600 may include other IO devices for receiving input from a user, for example, a keyboard or any suitable multi-point touch interface 608, a pointing device 610 (e.g., a mouse), a microphone 628, and/or an image capturing device 632 (e.g., a camera or scanner). The keyboard 608 and the pointing device 610 may be coupled to the visual display device 618. The computing device 600 may include other suitable conventional I/O peripherals.

The computing device 600 may also include one or more storage devices 624, such as a hard-drive, CD-ROM, or other computer readable media, for storing data and computer-readable instructions and/or software that implement exemplary embodiments of the UDF transformer system 101 described herein. Exemplary storage device 624 may also store one or more databases for storing any suitable information required to implement exemplary embodiments. For example, exemplary storage device 624 can store one or more databases 626 for storing information, such as product information including, for example, product specific information, product inventory information, product location information, and/or any other information to be used by embodiments of the system 101. The databases may be updated manually or automatically at any suitable time to add, delete, and/or update one or more items in the databases.

The computing device 600 can include a network interface 612 configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 600 can include one or more antennas 630 to facilitate wireless communication (e.g., via the network interface) between the computing device 600 and a network. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 15:
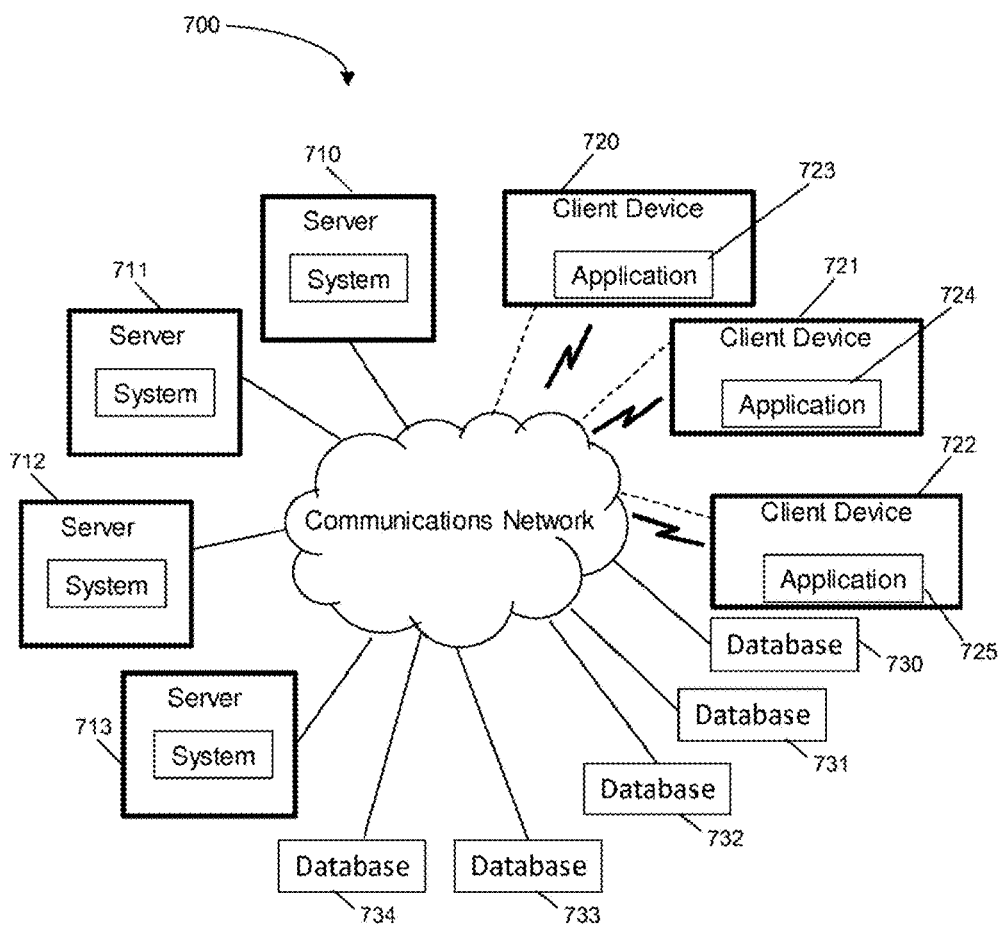
FIG. 15 shows a distributed networking system of an example embodiment in accordance with an aspect of the present disclosure.

FIG. 15 is a block diagram of an exemplary client-server environment 700 configured to implement one or more embodiments of the UDF transformer system. The environment 700 includes servers 710-713 operatively coupled to clients 720-722, via a communication network 750, which can be any network over which information can be transmitted between devices communicatively coupled to the network. For example, the communication network 750 can be the Internet, an Intranet, virtual private network (VPN), wide area network (WAN), local area network (LAN), and the like. The environment 700 can include repositories or databases 730-734, which can be operatively coupled to the servers 710-713, as well as to clients 720-722, via the communications network 750. The servers 710-713, clients 720-722, and databases 730-734 can be implemented as computing devices. Those skilled in the art will recognize that the database devices 730-734 can be incorporated into one or more of the servers 710-713 such that one or more of the servers can include databases. In an exemplary embodiment, part of the UDF transformer can be implemented by the server 710 and the another part of the UDF transformer can be implemented by one or more of the server 711-713 and/or databases 730-734. In some embodiments, the UDF transformer system can be distributed over different servers.

The client devices 720-722 can include a client side application 723 programmed and/or configured to access or execute the UDF transformer system. In the present embodiment, the client devices 720-722 can be computing devices including, for example, portable computing devices. In one embodiment, the client-side application 723 implemented by the client device 720 can be a web-browser capable of navigating to one or more web pages hosting GUIs of the UDF transformer. For example, in some embodiments, the client-side application 723 implemented by one or more of the client devices 720-722 (e.g., portable computing devices) can be an application specific to the environment installed on the client devices 720-722 to permit access to the UDF transformer system. In some embodiments, the application can be a mobile application installed and executed by a portable computing device. In exemplary embodiments, the client devices 720-722 can be configured to communicate with the network 750 via wired and/or wireless communication. The databases 730-734 can store information for use by the UDF transformer system.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A computer-implemented method for transforming user-defined-function invocations within a query-based environment, the method comprising:
   receiving a query with a user-defined-function (UDF) containing code written using imperative language constructs;
   transforming the imperatively defined UDF into an algebraic first expression tree, wherein generating part of the algebraic first expression tree comprises:
      determining a type of statement from a plurality of statements,
      choosing an apply-merge operator when the statement is an assignment statement,
      choosing a conditional-apply-merge operator when the statement is an if-then-else conditional statement,
      choosing a cross-apply operator when the statement is a return statement, and
      applying the operator to the statement to generate part of the algebraic first expression tree;
   constructing a second expression tree representation of the query absent the UDF;
   generating a transformed expression representation of the query by merging the algebraic first expression tree and the second expression tree based on parameters of the algebraic first expression tree, and attributes of the second expression tree; and
   simplifying the transformed expression using transformation rules, based on a determination that the transformed expression can be simplified.

2. The method of claim 1, wherein the algebraic first expression tree is constructed starting with a control flow graph having at least two nodes and an edge connecting the at least two nodes, wherein the edge represents a flow through statements of the UDF, and the nodes represent a statement of the UDF, and then applying transformations to create a parameterized algebraic expression tree.

3. The method of claim 1, wherein the constructing of the algebraic first expression tree includes applying a set of operators selected from one of an apply-bind operator, the apply-merge operator, the conditional-apply-merge operator, and the cross-apply operator.

4. The method of claim 1, wherein the generating of the transformed expression includes merging the algebraic first expression tree and the second expression tree by applying an apply-bind operator to map actual and formal parameters.

5. A system for transforming user-defined-function invocations within a query-based environment, the system comprising:
   a parser module configured to:
      receive a query with a user-defined-function (UDF) containing code written using imperative language constructs;
      parse the UDF and the query into a plurality of statements;
   a processor-implemented tree-construction module configured to:
      transform the imperatively defined UDF into an algebraic first expression tree wherein part of the algebraic first expression tree is generated by:
         determining a type of statement from the plurality of statements,
         choosing an apply-merge operator when the statement is an assignment statement,
         choosing a conditional-apply-merge operator when the statement is an if-then-else conditional statement,
         choosing a cross-apply operator when the statement is a return statement, and
         applying the operator to the statement to generate part of the algebraic first expression tree;
      construct a second expression tree representation of the query absent the UDF;
   a transformer module configured to:
      generate a transformed expression representation of the query by merging the algebraic first expression tree and the second expression tree based on parameters of the algebraic first expression tree, and attributes of the second expression tree; and simplify the transformed expression using transformation rules, based on a determination that the transformed expression can be simplified.

6. The system of claim 5, wherein the tree-construction module constructs the first tree expression includes applying a set of operators selected from one of an apply-bind operator, the apply-merge operator, the conditional-apply-merge operator, and the cross-apply operator.

7. The system of claim 5, wherein the tree-construction module constructs the algebraic first expression tree using a control flow graph having at least two nodes and an edge connecting the at least two nodes, wherein the edge represents a flow through statements of the UDF, and the nodes represent a statement of the UDF.

8. The system of claim 5, wherein the tree-construction module merges the first expression and the second expression by using an apply-bind operator to map actual and formal parameters.

9. A non-transitory computer-readable storage device configured to store instructions executable by a processing device, wherein execution of the instructions in a query-based environment causes the processing device to implement a method of transforming a user-defined-function invocation within the query-based environment comprising:
  receiving a query with a user-defined-function (UDF) containing code written using imperative language constructs;
  transforming the imperatively defined UDF into an algebraic first expression tree representation, wherein generating part of the algebraic first expression tree comprises:
    determining a type of a statement of a plurality of statements,
    choosing an apply-merge operator when the statement is an assignment statement,
    choosing a conditional-apply-merge operator when the statement is an if-then-else conditional statement,
    choosing a cross-apply operator when the statement is a return statement, and
    applying the operator to the statement to generate part of the algebraic first expression tree;
  constructing a second expression tree representation of the query absent the UDF;
  generating a transformed expression representation of the query by merging the algebraic first expression tree and the second expression tree based on parameters of the algebraic first expression tree, and attributes of the second expression tree; and
  simplifying the transformed expression using transformation rules, based on a determination that the transformed expression can be simplified.

10. The non-transitory storage device of claim 9, wherein the constructing of the algebraic first expression tree includes applying a set of operators selected from one of an apply-bind operator, the apply-merge operator, the conditional-apply-merge operator, and the cross-apply operator.

11. The non-transitory storage device of claim 9, wherein the algebraic first expression tree is constructed using a control flow graph having at least two nodes and an edge connecting the at least two nodes, wherein the edge represents a flow through statements of the UDF, and the nodes represent a statement of the UDF.

* * * * *